(12) United States Patent
Adragna et al.

(10) Patent No.: US 8,804,377 B2
(45) Date of Patent: Aug. 12, 2014

(54) CHARGE-MODE CONTROL DEVICE FOR A RESONANT CONVERTER

(75) Inventors: Claudio Adragna, Monza (IT); Aldo Vittorio Novelli, S. Lorenzo Parabiago (IT); Christian Leone Santoro, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 392 days.

(21) Appl. No.: 12/978,841

(22) Filed: Dec. 27, 2010

(65) Prior Publication Data

US 2011/0157927 A1 Jun. 30, 2011

(30) Foreign Application Priority Data

Dec. 28, 2009 (IT) .............................. MI2009A2307

(51) Int. Cl.
*H02M 3/335* (2006.01)
(52) U.S. Cl.
USPC ..................................... 363/21.02; 363/21.03
(58) Field of Classification Search
USPC ........................................... 363/21.02, 21.03
See application file for complete search history.

(56) References Cited

U.S. PATENT DOCUMENTS

| | | | |
|---|---|---|---|
| 3,953,779 A | 4/1976 | Schwarz | |
| 4,150,424 A | 4/1979 | Nuechterlein | |
| 4,694,383 A * | 9/1987 | Nguyen et al. | 363/17 |
| 5,550,498 A | 8/1996 | Kwan et al. | |
| 6,351,401 B1 | 2/2002 | Scheel et al. | |
| 8,085,559 B1 * | 12/2011 | Choi | 363/21.02 |
| 2002/0000796 A1 | 1/2002 | Popescu | |
| 2002/0071301 A1 * | 6/2002 | Kinghorn | 363/125 |
| 2008/0278984 A1 * | 11/2008 | Stanley | 363/95 |
| 2009/0196074 A1 * | 8/2009 | Choi | 363/21.02 |

FOREIGN PATENT DOCUMENTS

DE 2530631 A1 1/1977

OTHER PUBLICATIONS

Tang et al., "Charge Control: Modeling, Analysis and Design," Power Electronics Specialists Conference, 23rd Annual IEEE, vol. 1, pp. 503-511, 1992.
Tang et al., "Charge Control for Zero-Voltage-Switching Multi-Resonant Converter," Power Electronics Specialists Conference, 24th Annual IEEE, pp. 229-233, 1993.

* cited by examiner

*Primary Examiner* — Jue Zhang
(74) *Attorney, Agent, or Firm* — Seed IP Law Group PLLC

(57) ABSTRACT

A control device for a resonant converter, the control device including a first circuit to integrate at least one signal indicating a half wave of a current circulating in a primary winding of a transformer; the first circuit is structured to generate at least a control signal of the switching circuit depending on the integrated signal. The control device includes a second circuit to impose the equality of a switching-on time period of the first and second switches.

19 Claims, 5 Drawing Sheets

CHARGE-MODE CONTROL DEVICE FOR A RESONANT CONVERTER

BACKGROUND

1. Technical Field

The present disclosure relates to a charge-mode control device for a resonant converter.

2. Description of the Related Art

Forced switching converters (switching converters) with devices used for controlling them are known from the state of the art. Resonant converters are a wide range of forced switching converters characterized by the presence of a resonant circuit playing an active role in determining the input-output power flow. In these converters, a bridge (half bridge) consisting of four (two) power switches (typically power MOFSETs) supplied by a direct voltage generates a voltage square wave that is applied to a resonant circuit tuned to a frequency close to the fundamental frequency of said square wave. Thereby, because of the selective features thereof, the resonant circuit mainly responds to the fundamental component and negligibly to the higher-order harmonics of the square wave. As a result, the circulating power may be modulated by changing the frequency of the square wave, holding the duty cycle constant at 50%. Moreover, depending on the resonant circuit configuration, the currents and/or voltages associated with the power flow have a sinusoidal or a piecewise sinusoidal shape.

These voltages are rectified and filtered so as to provide dc power to the load. In offline applications, to comply with safety regulations, the rectification and filtering system supplying the load is coupled to the resonant circuit by a transformer providing the isolation between source and load, required by the above-mentioned regulations. As in all isolated network converters, also in this case a distinction is made between a primary side (as related to the primary winding of the transformer) connected to the input source and a secondary side (as related to the secondary winding(s) of the transformer) providing power to the load through the rectification and filtering system.

Presently, among the many types of resonant converters, the so-called LLC resonant converter is widely used, especially in the half bridge version thereof. The designation LLC comes from the resonant circuit employing two inductors (L) and a capacitor (C); a principle schematic of an LLC resonant converter is shown in FIG. 1. The resonant converter 1 comprises a half bridge of transistors Q1 and Q2 between the input voltage Vin and the ground GND driven by a driving circuit 3. The common terminal HB between the transistors Q1 and Q2 is connected to a circuit block 2 comprising a series of a capacitor Cr, an inductance Ls and another inductance Lp connected in parallel to a transformer 10 with a center-tap secondary. The two windings of the center-tap secondary of transformer 10 are connected to the anodes of two diodes D1 and D2 the cathodes of which are both connected to the parallel of a capacitor Cout and a resistance Rout; the voltage across the parallel Rout, Cout is the output voltage Vout of the resonant converter, while the dc output current Iout flows through Rout.

Resonant converters offer considerable advantages as compared to the traditional switching converters (non-resonant converters, typically PWM—Pulse Width Modulation—controlled): waveforms without steep edges, low switching losses in the power switches due to the "soft" switching thereof, high conversion efficiency (>95% is easily reachable), ability to operate at high frequencies, low EMI (Electro Magnetic Interference) generation and, ultimately, high power density (i.e. enabling to build conversion systems capable of handling considerable power levels in a relatively small space).

As in most dc-dc converters, a closed-loop, negative-feedback control system keeps the output voltage of the converter constant upon changing the operating conditions, i.e. the input voltage Vin and/or the output current Iout thereof. This is achieved by comparing a portion of the output voltage to a reference voltage Vref. The difference, or error signal Er, between the value provided by the output voltage sensing system (usually, a resistor divider) and the reference value is amplified by an error amplifier. Its output Vc modifies a quantity x inside the converter which the energy carried by the converter during each switching cycle substantially depends on. As discussed above, such a significant quantity in resonant converters is the switching frequency of the square wave stimulating the resonant circuit.

As in all control systems in dc-dc converters, the frequency response of the error amplifier should be properly designed so as to ensure:

a stable control loop (i.e. that, upon disturbances of the operating conditions of the converter, once the transient caused by the disturbance has finished, the output voltage tends to recover a steady state value close to that before the disturbance;

good regulation (i.e. the new constant value recovered by the output voltage following a disturbance is very close to that preceding the perturbation);

good dynamic performance (i.e. during the transient following a disturbance, the output voltage does not excessively deviate from the desired value and the transient itself is short).

The above-mentioned control objectives may be expressed in terms of some characteristic quantities of the transfer function of the control loop, such as the band width, the phase margin, the dc gain. In a dc-dc converter, these objectives may be achieved by acting on the frequency response of the error amplifier, modifying the gain thereof and conveniently placing the poles and zeroes of the transfer function thereof (frequency compensation). This is normally achieved by using passive networks comprising resistances and capacitors of appropriate value connected thereto.

However, in order to determine the frequency compensation needed to obtain the desired features of the transfer function of the control loop, it is necessary to know both the modulator gain, i.e. the gain of the system converting the control voltage Vc into the control quantity x, and the frequency response of the converter itself to the variations of the quantity x.

The modulator gain does not usually depend on the frequency, and is fixed inside the control integrated circuit.

Although dc-dc converters are strongly non-linear system just because of the switching action, with suitable approximations and under certain hypothesis, their frequency response may be described and represented by the same means used for linear networks and, therefore, by a transfer function characterized by gain, zeroes and poles. This transfer function essentially depends on the converter topology, i.e. the mutual configuration of the elements handling the power, on its operation mode, i.e. whether, at every switching cycle, there is a continuous current circulation in the magnetic part (Continuous Current Mode, CCM) or not (Discontinuous Current Mode, DCM), and on the quantity x controlled by the control loop. While in PWM converters different control methods are commonly used—traditionally, in resonant converters, the quantity used to control the converter is directly the switching frequency of the square wave applied to the resonant circuit.

In all integrated control circuits for dc-dc resonant converters available in the market, the control directly operates on the oscillation frequency of the half bridge (Direct Frequency Control, DFC). FIG. 2 shows a control system for this type of resonant converters. The output of the error amplifier 4 on the secondary side, having a part of the output voltage Vout at the input of the inverting terminal and a reference voltage Vref on the non-inverting terminal, is transferred to the primary side by a photocoupler 5 so as to ensure the primary-secondary isolation required by the safety regulations, and acts upon a voltage-controlled oscillator (VCO) 6 or a current-controlled oscillator (ICO) inside the control integrated circuit 30.

This type of control arises two classes of problems. A first one relates to the fact that, unlike PWM converters, dynamic small-signal models for resonant converters expressed in terms of gain, poles and zeroes are not known in the literature (there are some approximated forms of questionable practical use). In other words, the transfer function of the power stage is not known. A second class of problems relates to the fact that, according to study results based on simulations, said transfer function of the power stage shows a strongly variable dc gain, and a number of poles varying from one to three and with a very mobile position, depending on the operating point. There is finally a zero due to the output capacitor.

The large gain variation and the highly variable pole configuration make the frequency compensation of the feedback control loop quite problematic. As a result, it is virtually impossible to obtain a transient response optimized under all the operating conditions, and a considerable trade-off between stability and dynamic performance is required. Additionally, the energy transfer strongly depends on the input voltage (audio-susceptibility), so that the control loop has to significantly change the operating frequency to compensate said variations. Since in the input voltage of the converter there is always an alternating component with a frequency twice that of the mains voltage, the loop gain at that frequency needs to be quite high to effectively reject said alternating component and significantly attenuate the residual ripple visible in the output voltage.

All these factors risk to rise problems which may be not all solvable, especially when the load supplied by the converter has great dynamic changes and/or there are strict specifications on the dynamic accuracy or the response speed or the rejection of the input ripple.

Finally, another problem related to the DFC control method is the sensitivity of the switching frequency to the value of the components in the resonant circuit (Cr, Ls and Lp). These values have a statistical spread due to their fabrication tolerances and this adversely affects the effectiveness of the protection circuits. In fact, generally speaking, to avoid that a converter may be operated abnormally, the control quantity x should be limited. In the case of resonant converters, the resonant controllers implementing DFC allow the operating frequency of the half bridge to be top and bottom limited. These limits should be set considering that, due to the above-mentioned value spread, the operating frequency range of the converter will change accordingly. The minimum limit set to the frequency should thus be lower than the minimum value which may be taken by the lower end of said range, and the maximum limit higher than the maximum value which may be taken by the higher end of said range. This significantly reduces the effectiveness of the frequency limitation as a means for preventing abnormal operational conditions.

A response to said problems consists of using a converter control based on a charge-mode control (CMC); said method has been described for the first time in the article "Charge Control: Analysis, Modeling and Design" to W. Tang, F. C. Lee, R. B. Ridley and I. Cohen, presented at the Power Electronics Specialists Conference, 1992. PESC '92 Record., 23rd Annual IEEE 29 Jun.-3 Jul. 1992 Page(s): 503-511 vol. 1. The idea of applying it to the resonant converters, instead, dates back to the article "Charge control for zero-voltage-switching multi-resonant converter" to W. Tang, C. S. Leu and F. C. Lee, presented at the Power Electronics Specialists Conference, 1993. PESC '93 Record., 24th Annual IEEE 20-24 Jun. 1993 Pages: 229-233.

In the first article, a small signal analysis shows that the dynamics of a CMC-controlled converter is similar to that of a peak current mode-controlled system, i.e. with a single, low-frequency pole and a pair of complex conjugate poles at half the switching frequency. Unlike peak current mode, where the damping factor of said pair of poles depends only on the duty cycle (this is connected to the well known sub-harmonic instability, when this is higher than 50%), with CMC control such damping factor depends also on the storage inductance of the converter and on the load. The sub-harmonic instability problem is more complex to be analyzed. As a trend, the instability tends to occur for low values of the input current and, therefore, of the load of the converter. In both methods, however, adding a compensation ramp to the ramp of the current (or the integral thereof in case of CMC), solves the problem. Moreover, the integration process makes the CMC method more noise insensitive than peak current mode.

In the second article (by Tang et al), a control device of the CMC type is disclosed. It is adapted to a resonant forward topology and realized in a discrete form: the current passing through the primary power circuit is directly integrated by using a current transformer with two output windings and two separate rectification systems for charging two series-connected integrating capacitors. This system is not well suited to be integrated; furthermore, current sensing systems with transformers are used in high power conversion systems and not in low power systems for cost reasons.

BRIEF SUMMARY

In accordance with the present control device for a resonant converter is provided, the converter including a switching circuit adapted to drive a resonant load, the resonant load having at least one transformer with at least a primary winding and at least a secondary winding, the converter structured to convert an input signal into an output signal, the switching circuit including at least a half bridge of first and second switches, the central point of the half bridge being connected to the resonant load. The control device further includes a first input adapted to integrate at least one signal representative of a half wave of the current circulating in the primary winding, the first circuit adapted to generate at least a control signal of the switching circuit depending on the integrated signal, the control device including a second circuit adapted to impose the equality of the switching-on time period of the first and second switches.

In accordance with another aspect of the present disclosure, a control device for resonant converters is provided, which allows the dynamic order of the converter to be reduced, by possibly making it equivalent to a single-pole system (at least in the frequency range relevant to the design of the frequency compensation), so as to improve its transient response to load variations.

Moreover, said control device reduces the audio-susceptibility of the converter, either through a reduced sensitivity to the variations of the input voltage and/or to the possibility of more freely setting the loop gain, so as to improve both the transient response to the variations of the input voltage, and the rejection of the input voltage ripple.

The aforementioned control device also allows the operational limits of the converter to be set regardless of the dispersion of the resonant circuit parameters so as to improve the control strength.

BRIEF DESCRIPTION OF THE SEVERAL VIEWS OF THE DRAWINGS

The features and advantages of the present disclosure will become apparent from the following detailed description of practical embodiments thereof, shown by way of non-limiting example in the accompanying drawings, in which.

DETAILED DESCRIPTION

Figure 3:
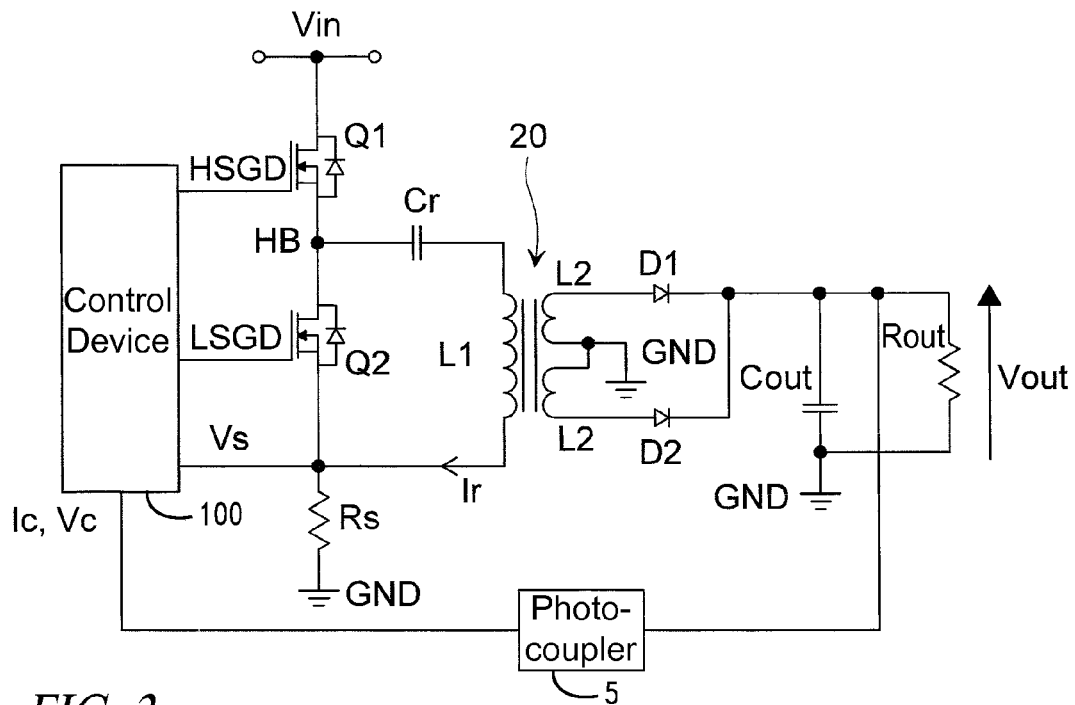
FIG. 3 shows a circuit schematic of a resonant converter with charge-mode control device in accordance with the present disclosure.

FIG. 3 shows a circuit schematic of a resonant converter with a charge-mode control (CMC) device 100 in accordance with the present disclosure.

The converter comprises a resonant load preferably comprising a transformer 20 with a primary winding L1 and a secondary with two windings L2; the primary winding L1 is connected to the central point HB of the half bridge and in common between the transistors Q1 and Q2 by means of a capacitor Cr and is directly connected to a sense resistor Rs connected to ground GND. The two windings L2 of the secondary are connected between ground GND and two respective diodes D1 and D2 having the cathodes in common and connected to the parallel of a resistance Rout and a capacitor Cout which are connected to ground GND. Transistors Q1 and Q2 are preferably MOS transistors, particularly NMOS transistors; the drain terminal of transistor Q2 is in common with the source terminal of transistor Q1 and is the central point HB of the half bridge. The resistor Rs is connected to the terminal in common between the source terminal of transistor Q2 and the terminal of the primary winding L1 and the ground GND. In the primary winding L1 the resonant current Ir flows.

FIG. 3 shows the current sense element in the switching circuit Q1-Q2 represented by the resistor Rs placed in series to the half bridge, in particular connected between the source terminal of transistor Q2 and ground GND, whereby at its terminals thereof there will be a voltage proportional to the current passing through itself. This is a non-limiting example only: as mentioned above, the sensing may be also carried out in other ways of the prior art (through a capacitive or resistive divider, with a current transformer, Hall sensor, etc.) providing a voltage signal accurately representing the instantaneous resonant current Ir.

Due to the aforesaid connection of the current sensing element, the voltage signal Vs only represents the mainly positive half wave of the resonant current Ir. The resonant current passes through the resistor Rs only when the transistor Q1 is on (and the transistor Q2 is off), thus generating a mainly positive voltage at the terminals thereof. When the transistor Q2 is on (and Q1 is off), the resonant current recirculates in a circuit without the resistor Rs, whereby the voltage at the terminals of Rs is zero. If the sensing element is actually a resistance, the advantage of said connection is a reduction of the power dissipated in said element.

Obviously, given the symmetry of the resonant current, also the other half wave of the resonant current Ir might be used for the control.

The control device 100 comprises first means 110 adapted to integrate at least one signal Vs representing a half wave of the resonant current Ir, preferably the half wave of the half cycle where it is mainly positive. The first means 110 are adapted to generate a control signal HSGD, LSGD of said switching circuit as a function of the integrated signal Vint, preferably two different control signals for the two transistors Q1 and Q2 of the half bridge Q1-Q2. Device 100 comprises second means 120 adapted to set the on-time periods Ton1 and Ton2 of said first Q1 and second Q2 transistors equal to one another. He device 100 has at the input the voltage Vs at the terminals of the resistor Rs and a voltage signal Vc or a current signal Ic provided by block 5 representing a feedback loop of the output voltage Vout of the converter; the current Ic or the voltage Vc is a control signal and is representative of the feedback loop controlling the output voltage Vout, preferably the signal Ic or the signal Vc is a function of the output current Iout and/or the input voltage Vin of the converter.

Figure 4:
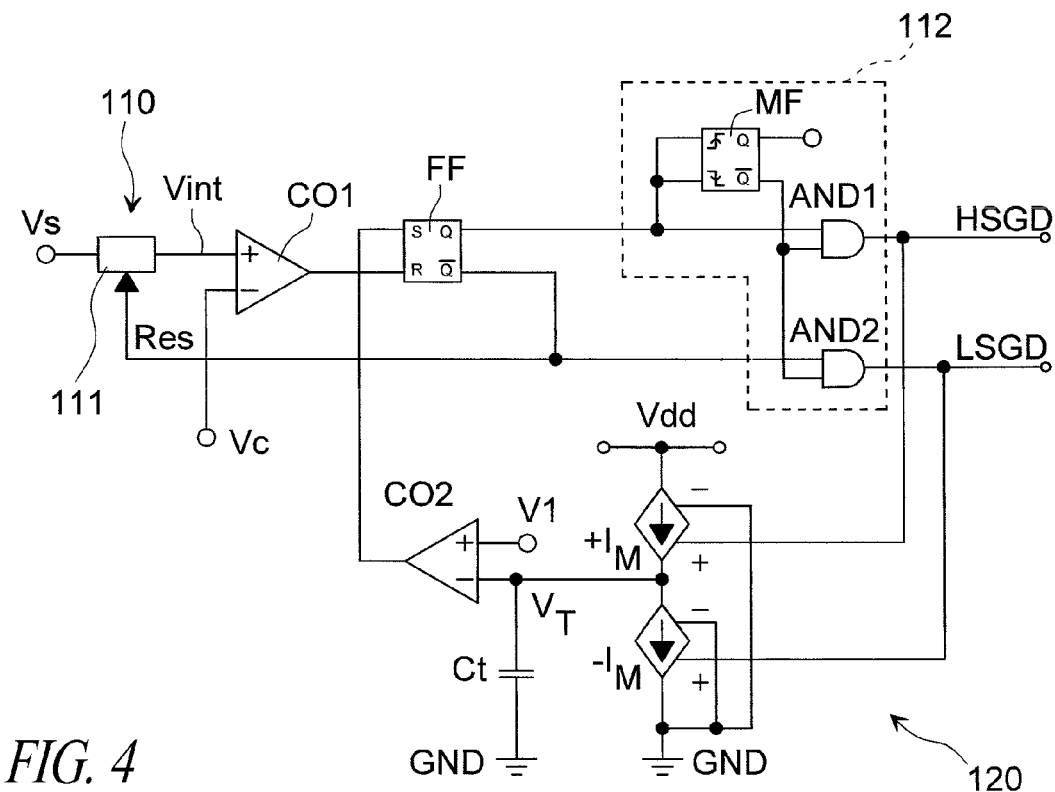
FIG. 4 shows a circuit schematic of a control device for a resonant converter in accordance with the first embodiment of the present disclosure.

FIG. 4 shows a diagram of a control device for a resonant converter in accordance with the first embodiment of the present disclosure.

Voltage Vs (voltage image of the mainly positive half wave of the resonant current) is brought to the input of the resettable integrator 111. Its output voltage Vint is compared to the control voltage Vc, generated by the control loop of the output voltage Vout of the converter, by a comparator CO1. In particular, the voltage Vint is at the positive input terminal of the comparator while the voltage Vc is at the negative input terminal.

The voltage at the output of comparator CO1 is sent to the reset input R of a set-reset flip-flop FF. The output Q of the flip-flop FF is connected to an input of the AND gate AND1 while the output $\overline{Q}$ is connected to an input of the AND gate AND2 and acts as the reset input Res of the integrator 111; the signals HSGD and LSGD at the output of gates AND1 and AND2 are the driving signals for the transistors Q1 and Q2 of the half bridge of the resonant converter in FIG. 3 and may have a high logic value or a low logic value.

It is assumed that the output Q of the flip-flop FF is initially high. The signal HSGD is high and, therefore, the transistor Q1 is on; the signal LSGD is low and, therefore, the transistor Q2 is off. The integrator 111 was previously reset and therefore the voltage Vint starts from zero. The resonant current Ir is initially negative (necessary condition for the soft-switching), whereby Vs is also negative and the output Vint of the integrator will initially take negative values. Resonant current Ir and Vs then become positive whereby Vint reaches the minimum thereof and starts increasing to become positive. When Vint≥Vc, the output of comparator CO1 goes high and resets the flip-flop FF; therefore, the output Q goes low along with the HSGD, while the output $\overline{Q}$ goes high thus resetting the integrator and making Vint zero.

The low signal HSGD immediately switches the transistor Q1 off, but transistor Q2 which should switch on as signal $\overline{Q}$ is high, still remains switched off for a time Td due to the action of the dead time generator block 112 comprising a monostable circuit MF and the two gates AND1 and AND2. This block maintains the signal LSGD low for a time Td. This delay is needed, upon switching Q1 off, to let the voltage of the node HB (midpoint of the half-bridge) go to zero. In this way, when transistor Q2 is switched on the drain-source voltage thereof is substantially zero (in particular slightly negative, clamped by the body diode of transistor Q2). The same obviously occurs during the opposite transition, between switching off the transistor Q2 and switching on the transistor Q1. This is the soft-switching mechanism that eliminates switching losses at turn-on. The time Td is fixed by the duration of low level of the monostable output that, sets the signals HSGD and LSGD both low during this time through the AND gates. The time Td may be internally fixed or adapted to the transition speed of the midpoint voltage by appropriate control systems.

Therefore, after elapsing the time Td, the transistor Q2 will be switched on and the resonant current will exactly have the same evolution seen in the previous half cycle where the transistor Q1 was on, but with opposite sign. However, such a current portion is not visible and an additional mechanism is needed to determine when the transistor Q2 should be switched off and the transistor Q1 switched on again (after the dead time Td).

In the resonant converters object of the invention, under steady-state conditions, the duration of the conduction of the two transistors is identical, so as to obtain symmetrical currents and voltages. In accordance with the invention, a means 120 is provided and adapted to measure the duration of the conduction period of transistor Q1 while setting the duration of the conduction period of transistor Q2 to be equal to that of transistor Q1.

Figure 5:
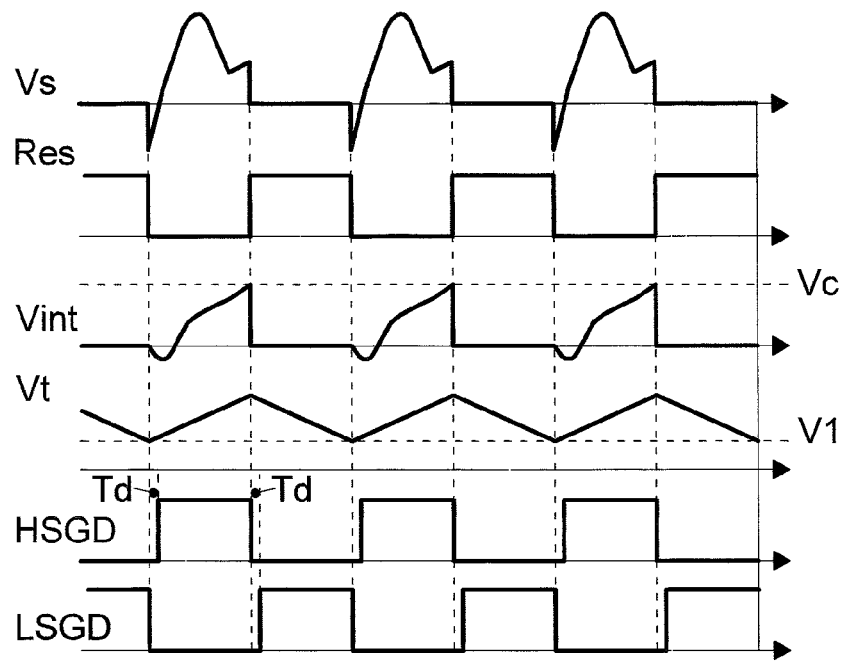
FIG. 5 shows some time diagrams of signals involved in the device of FIG. 4.

The means 120 preferably comprises the series of two constant current generators $+I_M$ and $-I_M$ connected between a supply voltage Vdd and ground GND, a capacitor Ct connected between the point in common of the two current generators and ground GND, and a comparator CO2 having the inverting input terminal connected to the voltage Vt at the terminals of capacitor Ct and the non-inverting input terminal connected to the reference voltage V1. When the transistor Q1 is on, the generator $+I_M$ driven by the signal HSGD is on too and charges the capacitor Ct with a constant current. The voltage on Ct is a linear ramp starting from a value V1. This ramp reaches the peak when the transistor Q1 is switched off because, as HSGD goes low, the generator $+I_M$ is switched off. Both generators are inactive, so this value is maintained during the time period Td. As soon as the signal LSGD goes high after the delay Td, the transistor Q2 is switched on, the generator $-I_M$, connected to the signal LSGD, switches on as well and discharges the capacitor Ct with the same current used for charging it. Therefore, the voltage across the capacitor Ct ramps down with the same slope it ramped up. As soon as it reaches the value V1, which triggers the comparator CO2, a time equal to conduction time of the transistor Q1 will be elapsed. Triggering the comparator CO2 stops the discharge of Ct (its voltage remains at the value V1 during the dead time Td) and sets the flip-flop FF. This causes the immediate switch-off of transistor Q2 and the switch-on of transistor Q1 after the dead time Td. A new switching cycle starts. FIG. 5 shows time diagrams of the signals Vs, Res, Vint, Vt, HSGD and LSGD related to the control device of FIG. 4.

In the just described circuit, the information on the duration of the conduction period of the transistor Q1 is stored in the peak value of voltage Vt. It is obvious that the voltage peak Vt could be fixed and the bottom value thereof used to store the duration of the conduction of transistor Q1.

Figure 6:
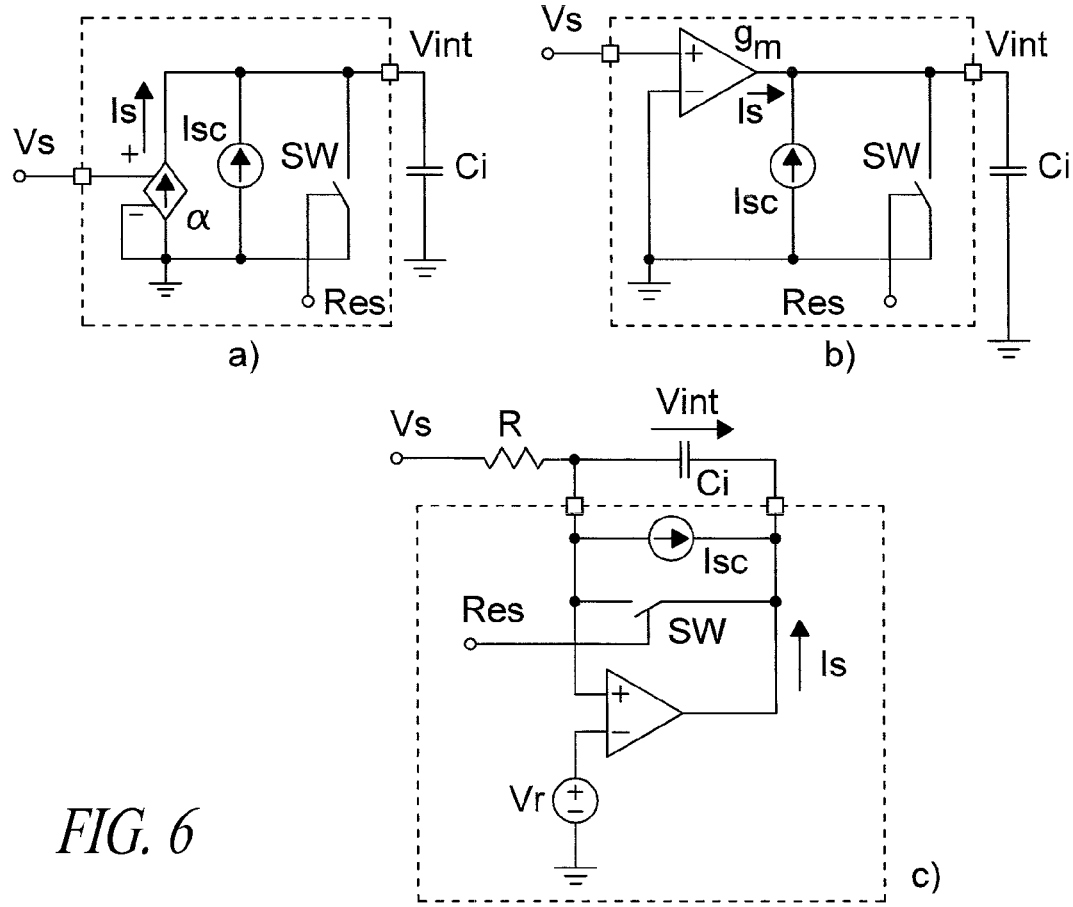
FIG. 6 shows some implementations of the integrator in FIG. 4.

The integrator shown in FIG. 4 may be realized in different ways. Some examples are shown in FIG. 6. Circuit a) comprises a current generator $I_s$ driven by the voltage Vs charging the capacitor Ci with a current proportional to Vs according to the factor α. The generator Isc is the generator operating the compensation to avoid the sub-harmonic instability. The Isc value may be fixed or dependent on one of the parameters of the control or, more generally, of the whole converter (e.g. the input voltage). Considering the constitutive equation of the capacitor, the voltage Vint at its ends will be proportional to the integral of Vs during the time when Q1 is on:

$$Vi(t) = \frac{1}{Ci} \int_0^t [\alpha Vs(t) + Isc] dt$$

The switch SW connected in parallel to the capacitor Ci and controlled by the signal Res, is switched on to discharge the capacitor Ci itself and make its voltage Vint equal to zero (reset function).

The controlled current generator shown in circuit a) may be realized with an operational transconductance amplifier as shown in circuit b). Its transconductance $g_m$ corresponds to the gain α of the controlled generator of circuit a). In both cases, the capacitor Ci will preferably be a component external to the integrated device U1 comprising the control device in accordance with the invention, and therefore connected to a special pin to provide the user with a calibration means of the time constant of the integration block.

In circuit c), there is an operational amplifier with the inverting input connected to the voltage Vs through the resistance R and the non-inverting input connected to a fixed voltage Vr, conveniently assumed equal to zero. The capacitor Ci is placed between its inverting input and the output so as to form an integrator circuit with a time constant R·Ci. The discharge switch SW operates exactly as in circuits a) and b). The voltage Vint across Ci is given by:

$$Vi(t) = \frac{1}{Ci} \int_0^t \left[\frac{1}{R} Vs(t) + Isc\right] dt$$

and therefore it determinates an operation similar to that of the other circuits.

The transistor-level implementation of the circuits in FIG. 6 might be complicated by the fact that in the initial conduction phase of Q1, the output Vint of the integrator takes negative values. The circuit topologies adopted should take this into account.

It should be noted that during all the period when the signal Res is high, the switch SW remains switched on and short-circuits the current generators. Even if it is not specifically shown in the circuits of FIG. 6, means disabling said generators during the period when the switch SW is closed could be optionally provided so as to reduce the energy consumption.

In circuits a) and b), the input impedance of the pin connected to the voltage Vs may also be very high (if the input stage is formed by MOSFETs, virtually infinite). In circuit c), instead, the charge current of Ci is output from said pin and flows on resistor Rs. Normally, this is not a problem because the charge currents are typically in the ten or hundred μA, by far less then the resonant current. Anyway, should this be a problem, this point could be a discriminating element when choosing the solution to be adopted in a specific device.

When Is<<Isc, i.e. when the resonant current and therefore the voltage Vs are low (which happens when the converter load is low, or when the converter starts due to the so-called "soft-start" circuits which cause the current to gradually increase so as to limit the stresses on the power components), the charge of Ci is almost completely due to Isc. Therefore, the control tends to lose the CMC features and take those of a direct control of the durations of the conduction periods, as done by the direct frequency control DFC, with a consequent degradation of the dynamic performance and of the control robustness to variations in parameters of the resonant circuit.

Figure 7:
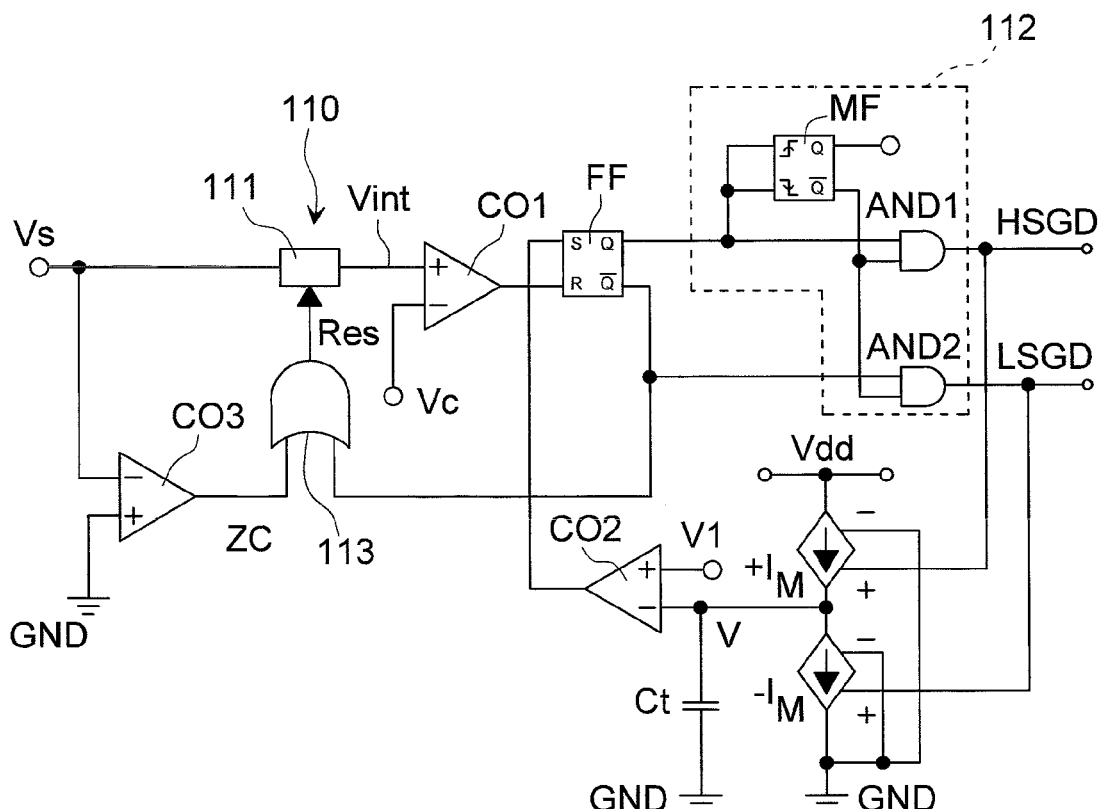
FIG. 7 shows a circuit schematic of a control device for a resonant converter in accordance with the second embodiment of the present disclosure.

FIG. 7 shows a control device in accordance with a second embodiment of the present disclosure.

Said device differs from that shown in the first embodiment for the presence of comparator CO3 and OR gate 113 acting on the signal Res of the resettable integrator 111. For this, one of the exemplary structures of FIG. 6 may still be considered. The comparator CO3 compares the voltage Vs with GND; its output ZC goes to the OR gate 113 along with the signal $\overline{Q}$. The output of 113, Res, is at the input of integrator 111. The signal ZC remains high during the initial conduction phase of transistor Q1, where the resonant current (and, therefore, also the voltage Vs) is negative. Therefore, even if the signal $\overline{Q}$ is low, the signal Res at the output of the OR gate remains high as long as the signal ZC becomes low, namely when the voltage Vs (or the resonant current) becomes positive. As a result, the integration of the signal Vs and the ramp Vint start when Vs is positive, rather than when the transistor Q1 is switched on, as it occurred in the circuit of FIG. 4.

Figure 8:
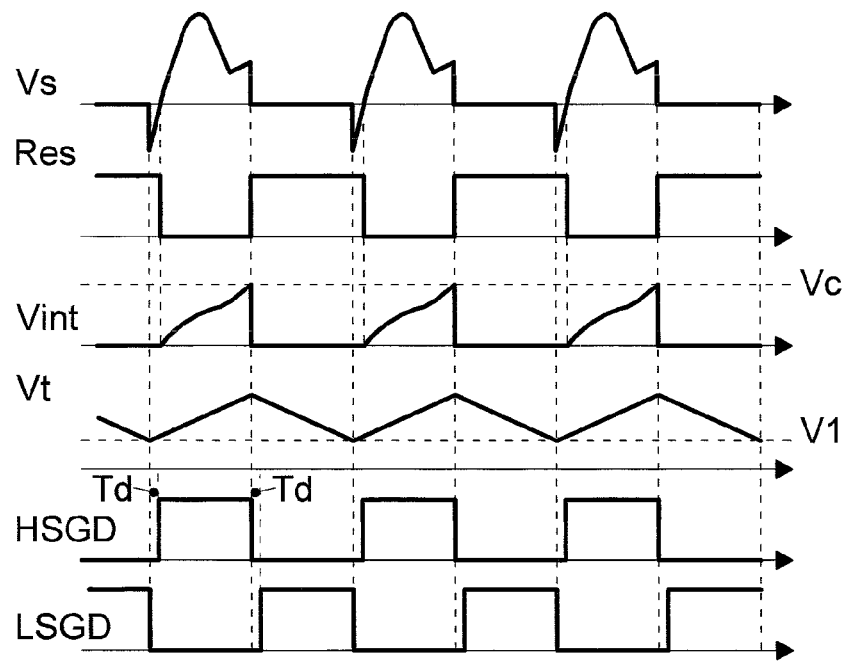
FIG. 8 shows some time diagrams of signals involved in the device of FIG. 7.

FIG. 8 shows the time diagrams of the signals Vs, Res, Vint, Vt, HSGD and LSGD related to the control device in FIG. 7.

As the voltage Vint now takes only positive values, with the control device in FIG. 7 the transistor-level structure of the integrator can be simplified.

Figure 9:
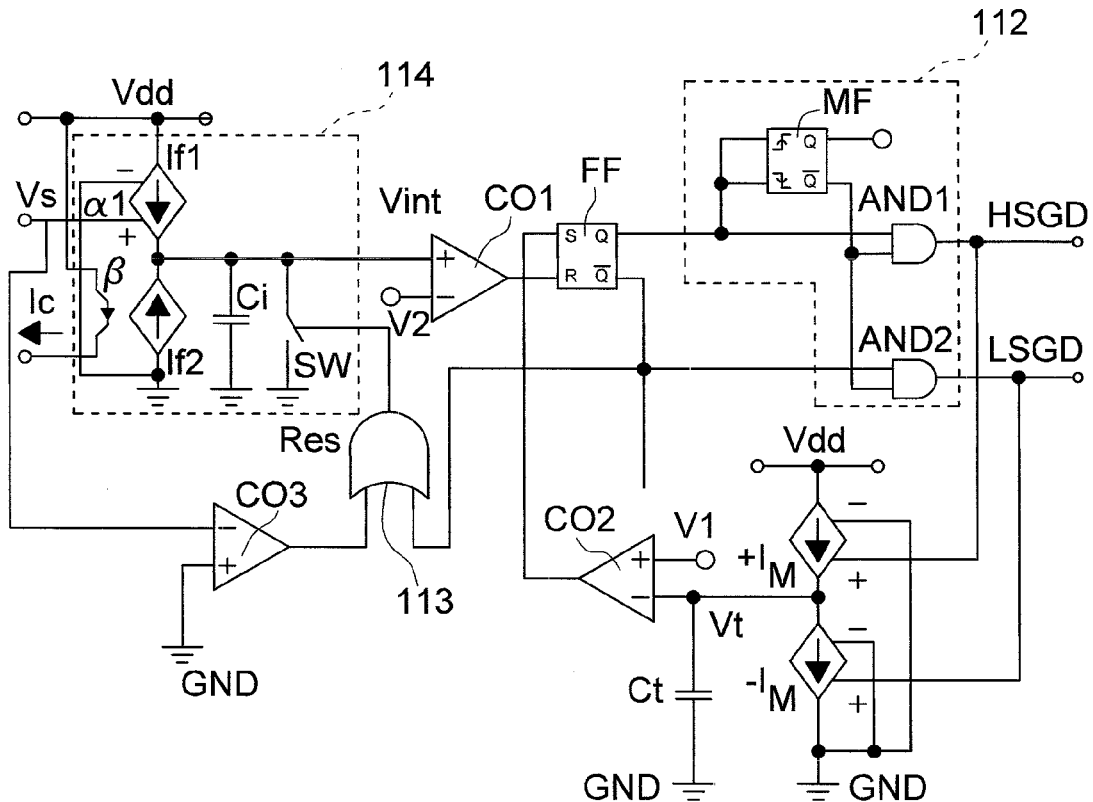
FIG. 9 shows a circuit schematic of a control device for a resonant converter in accordance with the third embodiment of the present disclosure.
Figure 10:
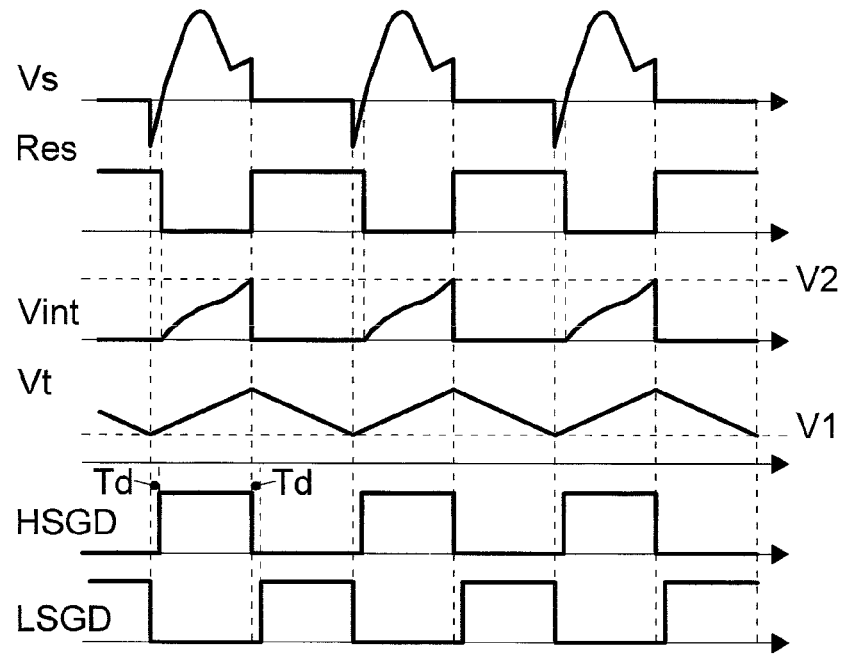
FIG. 10 shows some time diagrams of signals involved in the device of FIG. 9.

FIG. 9 shows a control device in accordance with the third embodiment of the present disclosure.

Figure 1:
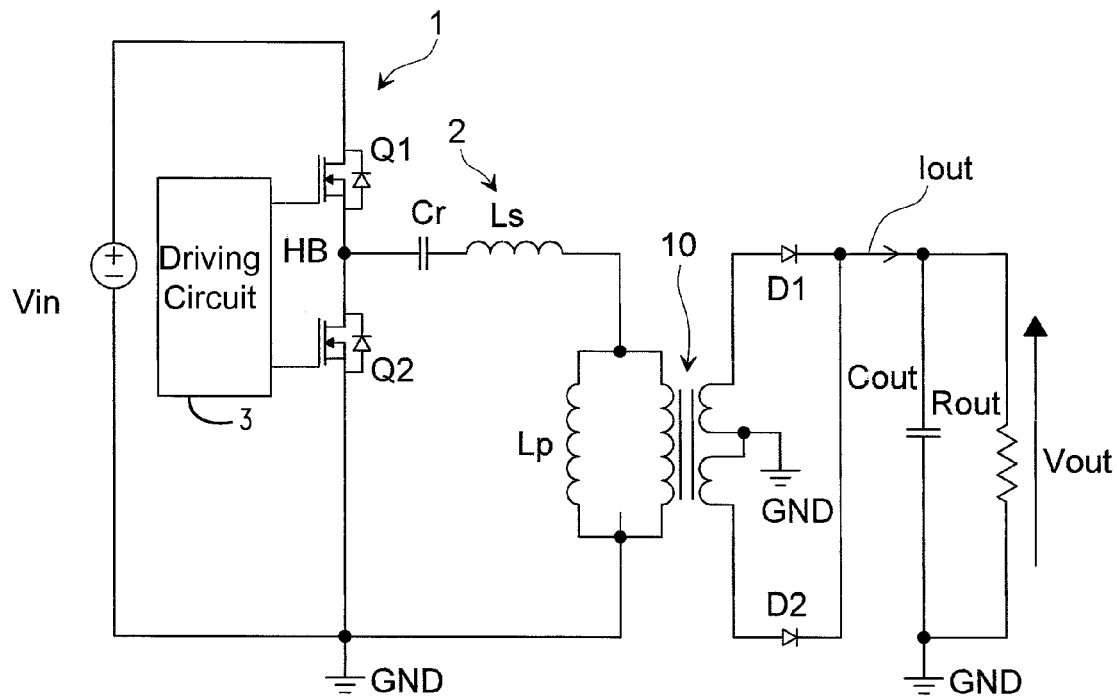
FIG. 1 shows a circuit schematic of an LLC resonant converter in accordance with a prior design.
Figure 2:
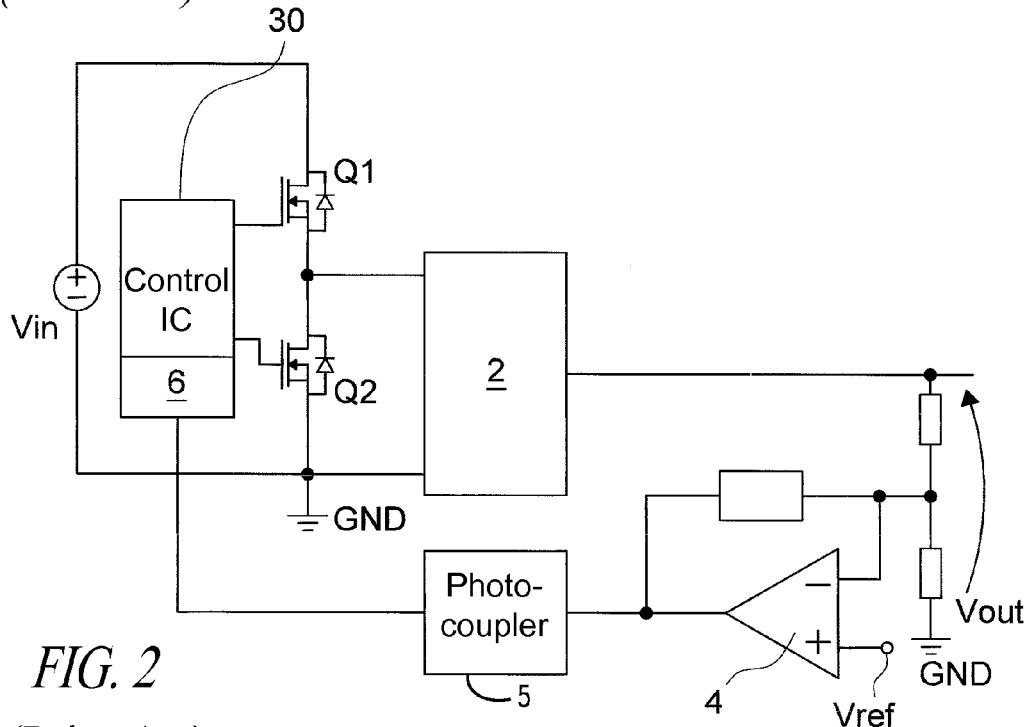
FIG. 2 shows a block schematic of a resonant converter with adjustment of the output voltage in accordance with a prior design.

Said device differs from that shown in the second embodiment for the presence of a different integration circuit having at the input, in addition to the voltage Vs, the current Ic representative of the feedback loop that controls the output voltage Vout of the resonant converter. Indeed, the signal provided by block 5 in the converters of FIGS. 2 and 3 is often a current. This current is at the minimum value in its range when the converter draws the maximum current from the input source (i.e., with maximum load and minimum input voltage) and reaches the maximum value when the input current is at a minimum (i.e., with minimum load and maximum input voltage).

In this embodiment the current Ic is used directly, in other possible equivalent embodiments it might previously converted into voltage.

In FIG. 9, the resettable integrator 114 has at the input the voltage Vs and the current Ic in addition to the reset signal Res. The integrator 114 comprises an integration capacitor Ci which is charged by the sum of a current If1 proportional to the voltage Vs, which is an image of the resonant current according to the constant α, as in circuit a) of FIG. 6, and a current If2 proportional to the control current Ic according to the constant β. The integrator 114 thus comprises a current generator If1 controlled by the voltage Vs and a current generator If2 controlled by the current Ic. The voltage ramp generated on the capacitor Ci is then compared to a voltage V2 by the comparator CO1 for determining the half bridge switching. The integrator 114 comprises a switch SW arranged in parallel to the capacitor Ci and controlled by the signal Res. The operation of the control device in FIG. 9 is the same as that of the device in FIG. 7.

The voltage V2 is not affected by the control loop, which does not imply it is necessarily a fixed voltage. It might be a function of some other electrical quantities, for example the converter input voltage.

The integrator/feedback combination realized in the block 114 is consistent with the operation of the converter: when the input current of the converter is to be at a maximum (and Ic, according to the above, is at a minimum under these conditions), most of the contribution to the voltage ramp on Ci should be provided by If1; therefore there will be a high signal Vs and a high current through the resonant circuit. On the contrary, when the current of the converter is to be at a minimum (and the current Ic, according to the above, is at a maximum under these conditions), most of the contribution to the voltage ramp Vint on the capacity Ci should be provided by the current If2; therefore there will be a small amplitude signal Vs and a small current will pass through the resonant circuit.

Furthermore, the current Ic also changes consistently with what required to prevent the problem of sub-harmonic instability. With heavy loads, where there is no problem of instability, current Isc should be small with respect to If1 so that the voltage Vint essentially depends on the latter and the operation is as close as possible to that of a pure CMC device; while, with light loads, where the problem arises, the current Isc should be comparable to If1 or even dominant, to ensure system stability. Therefore the control current also takes the role of compensation current.

An integrated circuit U1 comprising the control device for a switching converter in accordance with the present invention may be implemented; the control device may be any one of those shown in FIGS. 3, 4, 7 and 9. The circuit is integrated in a semiconductor chip.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit, comprising:
   a control circuit having:
      a set-reset flip-flop having a set input terminal, a reset input terminal, and first and second output terminals;
      a control signal generator that includes:
         an integrator circuit having first and second input terminals and configured to receive at least one input signal on the first input terminal and to generate an integrated signal; and
         a first comparator having a first input terminal structured to receive only the integrated signal from the integrator circuit, a second input terminal structured to receive a control voltage, and an output terminal coupled to the reset input terminal of the set-reset flip-flop, the first comparator structured to generate on the output terminal a first control signal;
      a switching control circuit that includes:
         first and second constant current generators connected in series at a common point and between a voltage source and a ground reference potential;
         a capacitor coupled between the common point and the ground reference potential; and
         a second comparator having a first input terminal directly connected only to the common point, a second input terminal coupled to a reference voltage source, and an output terminal coupled to the set input terminal of the set-reset flip-flop.

2. The circuit of claim 1, further comprising:
   first and second control signal output terminals; and
   a generator circuit that includes:
      a first logic gate having a first input terminal, a second input terminal coupled to the first output terminal of the set-reset flip-flop, and an output terminal coupled to the first control signal output terminal of the circuit;
      a second logic gate having a first input terminal, a second input terminal coupled to the second output of the set-reset flip-flop and to the second input terminal of the integrator circuit, and an output terminal coupled to the second control signal output terminal; and
      a monostable circuit having first and second input terminals that are both coupled to the first output terminal of the set-reset flip-flop, and an inverting output terminal coupled to both the first input terminal of the first logic gate and the first input terminal of the second logic gate.

3. The circuit of claim 2, wherein the first and second logic gates comprise AND gates, respectively.

4. The circuit of claim 3, comprising:
   a transformer having a primary winding with a first input terminal; and
   a half bridge circuit having a first output terminal coupled to the first input terminal of the primary winding of the transformer.

5. The circuit of claim 4, wherein the transformer has a secondary winding and the half bridge circuit includes first and second switches adapted to drive at least the primary winding of the transformer and at least the secondary winding of the transformer.

6. A control device for a resonant converter, the control device comprising:
   a flip-flop having first and second input terminals and first and second output terminals;
   an integrator circuit structured to receive at least one signal corresponding to a half wave of current in the resonant converter and to generate an integrated signal, the integrator circuit further including a first comparator having a first input structure to receive only the integrated signal, the first comparator further structured to generate a first control signal in response to the integrated signal and to transmit the first control signal to the first input terminal of the flip-flop; and
   a switching control circuit structured to impose equality of switching-on time periods of first and second switches in the resonant converter, the switching control circuit having an output terminal coupled to the second input terminal of the flip-flop and structured to transmit a second control signal on the output terminal to the second input terminal of the flip-flop.

7. The device according to claim 6, wherein the integrator circuit includes a first comparator configured to compare the integrated signal to a first signal and generate the first control signal in response to the integrated signal reaching or exceeding the first signal.

8. The device according to claim 7, wherein the flip-flop is configured to generate first and second complementary output signals on the first and second output terminals of the flip-flop, respectively, and the integrator circuit is structured to integrate the sum of the at least one signal corresponding to the half wave of the current circulating in the resonant converter and the second complementary output signal from the flip-flop.

9. The device according to claim 7, comprising a reset circuit structured to reset the integrator circuit in response to the integrated signal reaching or exceeding the first signal.

10. The device according to claim 7, comprising a reset circuit structured to reset the integrator circuit in response to the integrated signal reaching or exceeding the first signal or in response to the at least one signal corresponding to the half wave of the current circulating in the resonant converter being lower than zero.

11. The device according to claim 6, wherein the switching control circuit is structured to measure a conduction time period of the first switch and to impose a duration of the conduction time period of the first switch upon a duration of a conduction time period of the second switch.

12. The device according to claim 11, wherein the switching control circuit includes first and second current generators coupled in series at a common point and a capacitor having a first terminal coupled to the common point, and the first and second current generators are configured to be driven by two single control signals and adapted to charge and discharge the capacitor.

13. The device according to claim 6, wherein the switching control circuit includes:
   first and second constant current generators connected in series at a common point;
   a capacitor coupled to the common point; and
   a second comparator having a first input terminal coupled to the common point, a second input terminal coupled to a reference voltage, and an output terminal coupled to the second input terminal of the flip-flop and configured to output a second control signal to the flip-flop, the flip-flop configured to output first and second complementary output signals on the first and second output terminals in response to the first and second control signals.

14. A resonant converter, comprising:
   at least one transformer with a primary winding and a secondary winding;

a half bridge circuit having first and second switches coupled to a central point of the half bridge, the central point of the half bridge circuit coupled to the primary winding;

a control device that includes:

a flip-flop having first and second input terminals and first and second output terminals;

an integrator circuit structured to integrate at least one signal corresponding to a half wave of current in the resonant converter and to generate an integrated signal, the integrator circuit including a first comparator having a first input structure to receive only the integrated signal and a second input structured to receive a feedback signal, the comparator further structured to generate a first control signal to the first input terminal of the flip-flop in response to a comparison of the integrated signal and the feedback signal; and a switching control circuit structured to impose equality of switching-on time periods of the first and second switches, the switching control circuit having an output terminal coupled to the second input terminal of the flip-flop.

15. The converter according to claim 14, wherein the switching control circuit is structured to measure a conduction time period of the first switch and to impose a duration of the conduction time period of the first switch upon a conduction time period of the second switch.

16. A control method, comprising:

integrating a signal corresponding to a half wave of current circulating in a primary winding of a resonant converter;

generating a first control signal in response to the integrated signal to drive a switching circuit for the primary winding in response to the integrated signal;

generating a second control signal that imposes an equality of a switching-on time period of first and second switches in the switching circuit by:

generating a charge current and a discharge current of equal values;

charging a capacitor with the charge current at a charging rate starting from an initial voltage value during a conduction time of the first switch; and discharging the capacitor with the discharge current during a conduction time of the second switch at a discharge rate that is the same as the charging rate; and opening the second switch in response to the capacitor discharging to the initial voltage value.

17. The method of claim 16, comprising generating a delay period between a time of switching off of the first switch and a respective time of switching on of the second switch, and a delay period between the switching off of the second switch and the switching on of the first switch.

18. The method of claim 17, wherein the charging and discharging the capacitor comprises charging and discharging the capacitor with first and second switched current generators that are series coupled at a common point that is coupled to the capacitor, the first and second switched current generators are configured to generate the charge current and the discharge current, respectively.

19. The converter of claim 14, wherein the switching control circuit includes:

first and second constant current generators connected in series at a common point;

a capacitor coupled to the common point; and a second comparator having a first input terminal coupled to the common point, a second input terminal coupled to a reference voltage, and an output terminal coupled to the second input terminal of the flip-flop and configured to output a second control signal to the flip-flop, the flip-flop configured to output first and second complementary output signals on the first and second output terminals in response to the first and second control signals.

* * * * *